US011847792B2

(12) United States Patent
Ekkati et al.

(10) Patent No.: US 11,847,792 B2
(45) Date of Patent: Dec. 19, 2023

(54) LOCATION DETERMINATION AND MAPPING WITH 3D LINE JUNCTIONS

(71) Applicant: Niantic, Inc., San Francisco, CA (US)

(72) Inventors: Anvith Ekkati, Santa Clara, CA (US); Rong Yuan, Foster City, CA (US); Siddhant Jain, Sunnyvale, CA (US); Si ying Diana Hu, Mountain View, CA (US)

(73) Assignee: NIANTIC, INC., San Francisco, CA (US)

( * ) Notice: Subject to any disclaimer, the term of this patent is extended or adjusted under 35 U.S.C. 154(b) by 331 days.

(21) Appl. No.: 17/127,136

(22) Filed: Dec. 18, 2020

(65) Prior Publication Data

US 2021/0190538 A1 Jun. 24, 2021

Related U.S. Application Data

(60) Provisional application No. 62/952,016, filed on Dec. 20, 2019.

(51) Int. Cl.
*G06T 7/73* (2017.01)
*G06V 10/44* (2022.01)
(Continued)

(52) U.S. Cl.
CPC ............... *G06T 7/73* (2017.01); *G06V 10/44* (2022.01); *A63F 13/25* (2014.09); *G06T 2207/30244* (2013.01); *G06V 20/20* (2022.01)

(58) Field of Classification Search
CPC ...... G06V 10/443; G06V 20/20; G06V 10/44; G06T 7/73; G06T 2207/30244;
(Continued)

(56) References Cited

U.S. PATENT DOCUMENTS 10,820,172 B2 * 10/2020 Hu .................. G06V 20/10
10,885,714 B2 * 1/2021 Finman ................. G06T 17/05
(Continued)

FOREIGN PATENT DOCUMENTS

JP 2007-333679 A 12/2007
JP 2015-194373 A 11/2015
(Continued)

OTHER PUBLICATIONS

Wagner et al., Muddleware for Prototyping Mixed Reality Multiuser Games, IEEE Virtual Reality Conference 2007 (Year: 2007).*
(Continued)

*Primary Examiner* — Ishrat I Sherali
(74) *Attorney, Agent, or Firm* — FENWICK & WEST LLP

(57) ABSTRACT

A system and method for determining a location of a client device is described herein. In particular, a client device receives images captured by a camera at the client device. The client device identifies features in the images. The features may be line junctions, lines, curves, or any other features found in images. The client device retrieves a 3D map of the environment from the map database and compares the identified features to the 3D map of the environment, which includes map features such as map line junctions, map lines, map curves, and the like. The client device identifies a correspondence between the features identified from the images and the map features and determines a location of the client device in the real world based on the correspondence. The client device may display visual data representing a location in a virtual world corresponding to the location in the real world.

20 Claims, 6 Drawing Sheets

(51) Int. Cl.
*G06V 20/20* (2022.01)
*A63F 13/25* (2014.01)

(58) Field of Classification Search
CPC .......... G06T 2207/10016; G06T 7/579; A63F 13/25; A63F 13/213; A63F 13/216; A63F 13/65; G01C 21/30; G01C 21/3602; G01C 21/3638; G01C 21/3867
USPC ........................................................ 382/103
See application file for complete search history.

(56) References Cited

U.S. PATENT DOCUMENTS

| | | | |
|---|---|---|---|
| 10,904,723 B2* | 1/2021 | Hu | ............................ G01S 5/16 |
| 2008/0280676 A1 | 11/2008 | Distanik et al. | |
| 2009/0128549 A1* | 5/2009 | Gloudemans | ........... G06T 15/20 |
| | | | 345/419 |
| 2015/0084951 A1 | 3/2015 | Boivin et al. | |
| 2015/0213590 A1* | 7/2015 | Brown | ................... G06T 17/05 |
| | | | 345/419 |
| 2019/0028637 A1* | 1/2019 | Kolesov | ................... G06T 7/73 |

FOREIGN PATENT DOCUMENTS

| | | |
|---|---|---|
| JP | 2017-182302 A | 10/2017 |
| JP | 2019-101256 A | 6/2019 |
| KR | 10-2014-0058861 A | 5/2014 |
| TW | 201939105 A | 10/2019 |
| WO | WO 2015/192117 A1 | 12/2015 |

OTHER PUBLICATIONS

Ruwan et al., A collaborative Augmented Reality framework based on Distributed Visual SLAM, 2017 International Conference on Cyberworlds DOI 10.1109/CW.2017.47 (Year: 2017).*
Yu et al., Monocular Camera localization in Prior LiDAR Maps with 2D-3D Line Correspondences, 2020 IEEE 978-1-7281-6212-6/ 20, pp. 4588-4594. (Year: 2020).*
PCT International Search Report and Written Opinion, PCT Application No. PCT/IB2020/062238, dated Mar. 29, 2021, 13 pages.
Kim, H. et al., "A Novel Line Matching Method Based on Intersection Context," In 2010 IEEE International Conference on Robotics and Automation, May 3, 2010, pp. 1014-1021.
Lara, C. et al., "Robust Local Localization of a Mobile Robot in Indoor Environments Using Virtual Corners," Lecture Notes in Computer Science, 4756, Nov. 13, 2007, pp. 901-910.
European Patent Office, Extended European Search Report and Opinion, European Patent Application No. 20902667.3, dated Sep. 22, 2022, 8 pages.
Taiwan Intellectual Property Office, Office Action, TW Patent Application No. 109145174, dated Sep. 10, 2021, 21 pages.
Japan Patent Office, Office Action, Japanese Patent Application No. 2022-538066, dated Jul. 11, 2023, 12 pages.

* cited by examiner

LOCATION DETERMINATION AND MAPPING WITH 3D LINE JUNCTIONS

CROSS REFERENCE TO RELATED APPLICATIONS

This application claims the benefit of U.S. Provisional Application No. 62/952,016, filed Dec. 20, 2019, which is incorporated by reference in its entirety.

TECHNICAL FIELD

The present disclosure relates generally to 3D mapping, and, in particular, to using 3D line junctions to determine the location of a device.

BACKGROUND

A parallel reality game may provide a shared virtual world that parallels at least a portion of the real world can host a variety of interactions that can attract a community of players. Providing a virtual world with a geography that parallels at least a portion of the real world allows players to navigate the virtual world by navigating the real world. During play, a player may view the virtual world throughout a handheld or wearable device, which uses computer-mediated reality technologies to add, subtract, or otherwise alter the player's visual or audible perception of their environment.

However, accurately altering the player's visual perception of the environment typically involves accurately knowing the player's location in the real world. This may be difficult to ascertain since traditional positioning devices are not accurate enough to determine a player's location without a sizable range of error. Thus, improved approaches for determining a player's location in the real world are desirable.

SUMMARY

In location-based parallel reality games, players navigate a virtual world by moving through the real world with a location-aware client device, such as a smartphone. Many client devices used by players in the parallel reality game may include positioning devices that track player location information as players move throughout the real world while playing the parallel reality game. In various embodiments, client devices use image data captured by on-device camera(s) to determine players' locations, which may be used instead of or to supplement player location information gleaned from positioning devices. The client devices may produce augmented reality (AR) images to overlay on the image data based on the determined player locations.

According to one embodiment, an AR platform determines the location of a camera in an environment for a parallel reality game. Using one or more images captured by the camera, the AR platform identifies line junctions, which are points that lines in space intersect, in the one or more images. The AR platform compares these line junctions to a three-dimensional (3D) map of the environment to determine if the line junctions correspond to map line junctions in the 3D map. Based on one or more correspondences identified by the AR platform, the AR platform determines a location of the camera in the environment. The AR platform may generate a computer-mediated reality image for display on a client device associated with the camera reflecting a location in the virtual world that corresponds to the determined location in the real world.

In additional or alternative embodiments, the AR platform may receive one or more images representing a near real-time view of the environment seen by the camera and a geolocation position from a geolocation/global positioning system integrated in the client device. The AR platform estimates the distance between a camera position at a particular point in time and one or more mapping points in the one or more images. Based on the estimated distance, the AR platform overlays the one or more images with a computer-generated image located in a particular position in the 3D map. The computer-generated image remains positioned in the particular position as a player moves the camera to different positions in space.

These and other features, aspects and advantages may be better understood with reference to the following description and appended claims. The accompanying drawings illustrate specific embodiments and, together with the description, serve to explain various principles. However, the drawings should not be considered limiting. Rather, the scope of protection should be determined from the claims.

BRIEF DESCRIPTION OF THE DRAWINGS

FIG. 2A depicts a line junction, according to one embodiment.

FIG. 2B depicts intersection lines at a line junction, according to one embodiment.

DETAILED DESCRIPTION

A system and method determines a location of a client device in an environment and enables a user's interactions with the real world via the client device based on the location. Furthermore, the system may create a three-dimensional (3D) map (e.g., with a resolution of one centimeter) of the environment to use to determine the location of the client device. In various embodiments, the mapping is accomplished on the client side (e.g., a phone or headset) and is paired with a backend server that provides previously compiled imagery and mapping back to the client device.

In one embodiment, the system uses one or more models to assess the location of a camera (e.g., on a client device) based on one or more images captured by the camera. Using one or more models involves the system detecting line junctions within the one or more images and projecting the line junctions between 3D and 2D space to determine whether they correspond to map line junctions from a 3D map of the environment around the camera. Based on correspondences between the line junctions and map line junctions, the system can triangulate the camera's location in space. Using this location, the system can augment the one or more images for a parallel reality game, such that a player of the game using the client device may see virtual elements or other virtual information in the virtual world that correspond to their location in the real world.

Example System

Figure 1:
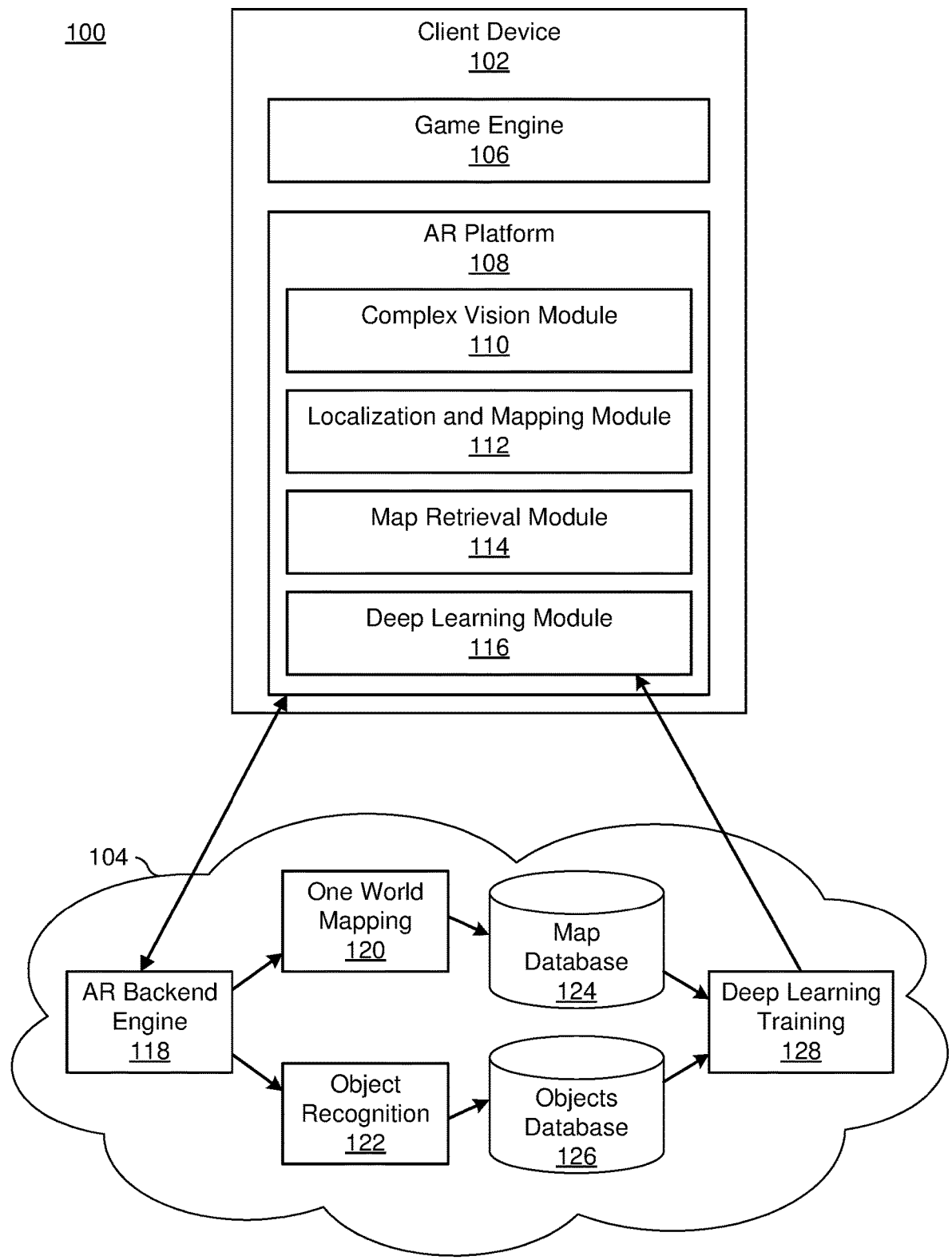
FIG. 1 is a block diagram of an AR computing system 100, according to one embodiment.

FIG. 1 is a block diagram of an AR computing system 100, according to one embodiment. The AR computing system 100 includes a client device 102 cooperating with elements accessed via a network 104. For example, the elements may be components of a server device configured to produce AR data. In the embodiment shown, the client device 102 includes a game engine 106 and an AR platform 108. The game engine 106 is renders a parallel reality game for a user of the client device 102 to play. The game engine may be the UNITY® game engine or another physics/rendering engine. The AR platform 108 may execute segmentation and object recognition on image data captured by a camera of the client device 102.

The AR platform 108 shown in FIG. 1 includes a complex vision module 110, a localization and mapping module 112, a map retrieval module 114, and a deep learning module 116. In other embodiments, the AR platform may include alternative or additional modules, such as a training module or an object recognition module. Furthermore, in some embodiments, the AR platform may be located at the server device with the elements and accessed via the network 104 or the elements may be located at the AR platform 108.

The complex computer vision module 110 executes client-side image processing. Such image processing may include image segmentation, local 3D estimation, and the like. In some embodiments, the complex computer vision module 110 may convert images to point clouds or process images to add features described in the images to a 3D map of an environment around the client device 102.

The localization and mapping module 112 maps the environment around the client device 102 and determines the client device's 102 location in the environment. The localization and mapping module 112 may use one or more of a plurality of approaches for mapping the environment and determine the location of the client device 102.

The localization and mapping module 112 receives one or more images (or other image data, such as video) from a camera of the client device 102. In some embodiments, the localization and mapping module 112 receives other sensor data captured by the client device 102 (e.g., illumination data, image data, and/or GPS coordinates), which the localization and mapping module 112 may use to determine a location of the client device 102. The localization and mapping module 112 may receive the images (and sensor data) in real-time as the client device 102 moves about the environment.

The localization and mapping module 112 determines a location of the client device 102 in the environment based on the received images. In some embodiments, the localization and mapping module 112 receives GPS coordinates of the client device 102 in the real world from a global positioning system located at the client device 102. The localization and mapping module 112 may use these GPS coordinates to represent the location of the client device 102 or may use these GPS coordinates as reference for a general location of the client device 102 and determine a more accurate location of the client device 102 using one or more other models or systems.

In some embodiments, the localization and mapping module 112 uses the Simultaneous Localization and Mapping (SLAM) software development kit (SDK) functions to generate a map of the environment. In particular, the SLAM SDK functions may include a mapping system that builds up point clouds based on images or other image data, which are used to form a map of the environment. The localization and mapping module 112 may store the map locally or may store the map in the map database 124. Based on the map, the localization and mapping module 112 may use tracking to find the location of the client device 102 in space. The localization and mapping module 112 further uses the SLAM processes to re-project one or more animations or an augmented value onto the images for display to a user of the client device. For example, based on the location of the client device, the localization and mapping module 112 may add one or more virtual elements or other information from the virtual world to the images of the user to see. Virtual elements and the like are described in relation to FIG. 4.

In other embodiments, the localization and mapping module 112 has multiple models available for determining the location of the client device 102. These models may include a point cloud based model (e.g., as provided by SLAM), a plane matching model, a line matching model, a geographic information system (GIS) model, a building recognition model, and a landscape recognition model. The localization and mapping module 112 may select one or more of the models for localization based on sensor data captured by the client device 102. For example, the plane and line matching models might be most accurate indoors whereas the landscape and building models might be most accurate outdoors. Thus, the client device 102 may determine, based on the sensor data, that the client device 102 is indoors or outdoors and select the more effective models for localization.

In one exemplary embodiment, the localization and mapping module 112 applies a line junction model to the images to localize the client device 102. In particular, the line junction model identifies one or more line junctions in the one or more images. Line junctions are points where two or more lines in space meet, as depicted in images. For example, an image of the front of a desk may show line junctions at each corner on the desk where the edges (e.g., lines) meet. In some embodiments, the line junction model may identify other features in the images, such as curves.

The line junction model accesses a 3D map of the environment. The 3D map may be stored locally at the client device or stored at the map database 124 accessed via the network 104. The 3D map may contain map line junctions, which are line junctions already identified in the 3D map, or other features, such as lines and curves. Alternatively, the map retrieval module 114 may access the 3D map for the line junction model and input the 3D map to the line junction model.

The line junction model compares the identified line junctions (or, in some cases, features) to the 3D map to find corresponding line junctions (or features). Based on the correspondences found by the line junction model, the line junction model determines a location of the client device 102 in the environment. The process used by the line junction model to determine the location of the client device 102 is further described in relation to FIGS. 2A-2C.

In one embodiment, to select one or more models, the localization and mapping module 112 assigns each model a score indicating likelihood that the model will generate an accurate location for the client device 102. The scores may be determined based on a current circumstance of the client device 102 as indicated by the sensor data. The localization and mapping module 112 selects one or more models for localization based on the scores and a set of selection criteria. For example, the client device 102 might select the model with the highest score, the three highest scoring models, or all models with a score above a threshold.

Additionally or alternatively, localization and mapping module 112 may select one or more models based on which models were previously selected in similar locations. For example, if the GPS coordinates for the client device 102 are within a threshold of GPS coordinates where the plane matching model was previously used successfully, the localization and mapping module 112 might boost the score of the plane matching model or select the plane matching module unless another model's score exceeds the score for the plane matching model by a threshold amount. Similarly, if a particular model was previously selected and failed to provide an accurate location, the localization and mapping module 112 may reduce the score for that model. Thus, the successes and failures of the models at similar GPS coordinates may be used to inform which model or models the localization and mapping module 112 selects to determine a more precise location than is provided by the GPS coordinates (e.g., to within one centimeter).

In a similar way, the localization and mapping module 112 may consider the successes and failures of the models at locations that the sensor data indicates are similar to the current location of the client device 102. For example, localization and mapping module 112 may classify locations as indoors and outdoors and rule out or select certain models (or increase or decrease their corresponding scores) based on whether the sensor data indicates the client device 102 is currently indoors or outdoors. Similarly, the localization and mapping module 112 may select one or more models based on illumination level (e.g., one model may be particularly effective relative to the others in low light conditions and thus be preferentially selected if the illumination level detected by the client device 102 is below a threshold). One of skill in the art will recognize other ways in which the collected data may be used to impact which model or models are selected to favor selection of those that are most likely to produce an accurate result in the current conditions.

The localization and mapping module 112 may apply the selected model or models to generate potential locations for the client device 102. In the case where only a single model was selected, the localization and mapping module 112 may use the generated location as the actual location of the client device 102. However, where GPS coordinates are available, if the location determined using the model differs from the GPS coordinates by more than a threshold amount, the localization and mapping module 112 may apply additional models or otherwise seek to verify the current location.

Where more than one model was selected, each model may produce a potential location of the client device 102. The localization and mapping module 112 determines a current location for the client device 102 based on the potential locations. In one embodiment, the localization and mapping module 112 calculates the current location as the mean of the locations generated by the models. In another embodiment, the localization and mapping module 112 uses a weighted average of the potential locations. For example, the localization and mapping module 112 may weight the contribution of each model by its score from the model selection phase. Alternatively, the localization and mapping module 112 may preset the weightings to favor certain models over others. In further embodiments, the localization and mapping module 112 may combine potential locations in other ways, such as taking the one that most closely matches the device's GPS coordinates.

In some embodiments, once the localization and mapping module 112 has determined a location of the client device 102, the localization and mapping module 112 retrieves AR data describing the virtual world to add to the one or more images to be presented at the client device 102. For instance, the localization and mapping module 112 may access a map database 124 (stored locally or at a server device accessed via the network 104) to retrieve one or more virtual elements or other information from the virtual world to add to the images. Virtual elements and the like are described in relation to FIG. 4.

The map retrieval module 114 retrieves previously generated maps. For instance, the map retrieval module 114 may access a map database 124 via the network 104 and send information retrieved from the map database to one or more other modules of the client device 102, such as the localization and mapping module 112. In some embodiments, the map retrieval module 114 may store some maps (e.g., a map for a user's home location) locally. The deep learning module 116 applies machine-learned algorithms for object recognition. The deep learning module 116 may obtain the machine-learned algorithms after training via the network 104. In some embodiments, the deep learning module 116 may also provide results of object recognition and/or user feedback to enable further model training.

In the embodiment shown, the components accessed via the network 104 (e.g., at a server computing device) include an AR backend engine 118 in communication with a one world mapping module 120, an object recognition module 122, a map database 124, an objects database 126, and a deep learning training module 128. In other embodiments, additional or different components may be included. Furthermore, the functionality may be distributed differently than described herein. For example, some or all of the object recognition functionality may be performed at the client device 102.

The one world mapping module 120 fuses different local maps together to create a composite real-world map. As noted previously, GPS position data from the client device 102 that initially generated the map may be used to identify local maps that are likely to be adjacent or overlapping. Pattern matching may then be used to identify overlapping portions of the maps or that two local maps are adjacent to each other (e.g., because they include representations of opposite sides of the same object). If two local maps are determined to overlap or be adjacent, a mapping can be stored (e.g., in the map database) indicating how the two maps relate to each other.

The object recognition module 122 uses images/object information and collected 3D data to identify features in the real world that are represented in the data. In this manner, the server device determines that a chair, for example, is at a 3D location and accesses an object database 126 associated with the location. The deep learning module 128 may be used to fuse the map information with the object information. In this manner, the system 100 may connect 3D information for object recognition and for fusion back into a map.

The map database 124 includes one or more computer-readable media configured to store the map data generated by client devices 102. The map data can include local maps of 3D point clouds stored in association with images and other sensor data collected by client devices 102 at a location. The map data may also include mapping information indicating the geographic relationship between different local maps. Similarly, the objects database 126 includes one or more computer-readable media configured to store information about recognized objects. For example, the objects database 126 might include a list of known objects (e.g., chairs, desks, trees, buildings, etc.) with corresponding locations along with properties of those objects. The properties may be generic to the object type or defined specifically for each instance of the object (e.g., all chairs might be considered furniture but the location of each is defined individually). Although the map database 124 and the objects database 126 are shown as single entities, they may be distributed across multiple storage media at multiple devices (e.g., as a distributed database).

Example Line Junction Model

The localization and mapping module 112 may employ a line junction model that uses a 3D map to locate a client device 102 based on one or more images it captures. The following paragraphs explain how one embodiment of the model is defined and applied mathematically.

1. Parameterize 3D Junctions

FIG. 2A depicts an example of a 3D line junction, according to one embodiment. The line junction comprises point Q and direction vectors (or, in some embodiments, lines or line segments) $D_1$ and $D_2$. Each direction vector is a unit vector, which has a length of 1. Each 3D line junction has seven degrees of freedom: three for the point Q represent its location in 3D space and two for each direction vector ($D_1$ and $D_2$) since they are unit vectors.

To avoid constrained optimization, the line junction model parametrizes the two direction vectors as follows, wherein X, Y, and Z represent the coordinates of the direction vectors in 3D space, θ represents the direction in which the angle from the +Z-axis is increasing, and α represents the direction in which the angle in the X-Y plane counterclockwise from the +Z-axis is increasing:

$$D_1 = (X_1, Y_1, Z_1) = (\cos\theta_1 \cos\alpha_1, \cos\theta_1 \sin\alpha_1, \sin\theta_1).$$

$$D_2 = (X_2, Y_2, Z_2) = (\cos\theta_2 \cos\alpha_2, \cos\theta_2 \sin\alpha_2, \sin\theta_2).$$

Since a unit vector's norm is 1, then $$(\cos\theta\cos\alpha)^2 + (\cos\theta\sin\alpha)^2 + (\sin\theta)^2 = \cos^2\theta(\cos^2\alpha + \sin^2\alpha) + \sin^2\theta \quad (1)$$
$$= \cos^2\theta + \sin^2\theta$$
$$= 1$$

Thus, the line junction model can parametrize the 3D line junction as a 7-vector $(\theta_x, \theta_y, \theta_z, \theta_1, \alpha_1, \theta_2, \alpha_2)$.

2. Projecting 3D Junction to 2D Space

The line junction model projects the 3D line junction into 2D space to get two intersection lines ($L_1$ and $L_2$), as shown in FIG. 2B. In particular, using the point Q, one direction vector $D_1$, and camera pose (R,T), the 2D line function is defined as the cross product of two distinct points ($P_1$ and $P_2$) on the line, leading to the following equation:

$$P_1 \wedge P_2$$

$$\sim (RQ+T) \wedge (R(Q+D_1)T)$$

$$\sim (RQ+T) \wedge (RQ+T+RD_1)$$

$$\sim (RQ+T) \wedge (RQ+T) + (RQ+T) \wedge (RD_1)$$

$$\sim (RQ+T) \wedge (RD_1)$$

$$\sim R(Q \wedge D_1) + T \wedge RD_1$$

$$\sim (RQ_x + T_x R)D_1 \quad (2)$$

where $P_1$, $P_2$ are two points on the line, $\wedge$ is cross product, and $Q_x$, $T_x$ are the skew-symmetric matrices for vectors Q and T.

Thus, the 2D projection is $(RQ_x + T_x R)D_1$ for direction vector $D_1$. The line junction model may use the same process to derive the 2D projection for direction vector $D_2$.

3. Reprojection Error

The line junction model determines keylines in the one or more images to determine an error in creating the 2D projection from the 3D line junction. Keylines are boundary lines that separate areas of different colors within the images. Since the 2D projection is a line function, the line junction model can compare the point to line distance from both endpoints of a detected keyline. If four endpoints are denoted as u, v, x, and y, on two keylines respectively, the line junction model may determine distances for each. Taking u as an example, the distance is $$\frac{u \cdot L}{\sqrt{d^2}},$$

where L=(A, B, C) is the 2D line equation of a 2D line projection and $d^2 = A^2 + B^2$.

$$L = (RQ_x + T_x R)D \quad (3)$$

If $L_1$ and $L_2$ are the 2D projections of two 3D lines, respectively, the actual residual is a 4-vector as follows:

$$\begin{bmatrix} \frac{uL_1}{\sqrt{d_1^2}} \\ \frac{vL_1}{\sqrt{d_1^2}} \\ \frac{xL_2}{\sqrt{d_2^2}} \\ \frac{yL_2}{\sqrt{d_2^2}} \end{bmatrix} \in R^4 \quad (4)$$

*here $u, v, x, y$ are constant, and $L_1, L_2, d_1, d_2$ are variables of $(Q, D_1, D_2, R, T)$ 4. Optimization Setup To optimize set up of the 2D projections, the line junction model must solve an unconstrained minimization problem to determine the location of the client device 102 (e.g., camera) in the environment. Due to non-linearity, in one embodiment, the line junction model uses a Levenberg-Marquardt (or "LM") solver. A general update step is as follows:

$$\Delta P = -(J^T J + \lambda I)^{-1} J^T r$$

where J is the Jacobian of the reprojection error, r is the residual, and λ is a req term.

The one or more images include a plurality of landmarks (e.g., line junctions, point clouds, lines, etc.), and since there are lots of landmarks in a typical image, the line junction model may use an alternating direction approach to optimize the set up. This enables the line junction model to compute a step for one landmark or frame of an image at a time while fixing all other variables. An advantage of this approach is that the Jacobian matrix has a relatively small size, which leads to faster computation for the line junction model.

In one embodiment, the pipeline followed by the line junction model for optimization can be summarized as follows:
While not converged:
  For each landmark:
    compute LM step
    update landmark
  For each frame:
    compute LM step
    update frame.

The line junction model uses this process to optimize and computes the Jacobian for each variable, as described below. These derivations are described with respect to the line junction model, but in some embodiments, the line junction model may not complete these derivations each time it is applied or the line junction model may only use the resulting equations to determine a location of the client device 102 rather than completing the derivations themselves.

5. Jacobian—3D Junction—Junction Point Q

To compute the Jacobian for Q, $J_Q$, the Jacobian should be of size $4k \times 3$, where k is the number of frames in the one or more images. For each frame k, the residual rk is as follows:

$$rk = \begin{bmatrix} \frac{U_k L_{k_1}}{\sqrt{d_{k_1}^2}} \\ \frac{V_k L_{k_1}}{\sqrt{d_{k_1}^2}} \\ \frac{X_k L_{k_2}}{\sqrt{d_{k_2}^2}} \\ \frac{Y_k L_{k_2}}{\sqrt{d_{k_2}^2}} \end{bmatrix} \quad (6)$$

where $\begin{aligned} L_{k1} &= (R_k Q_k + T_k R_k) D_1 \\ L_{k2} &= (R_k Q_k + T_k R_k) D_2 \end{aligned}$ and $\begin{aligned} d_{k_1}^2 &= L_{k_{11}}^2 + L_{k_{12}}^2 \\ d_{k_2}^2 &= L_{k_{21}}^2 + L_{k_{22}}^2 \end{aligned}$ From the residual rk, the line junction model can derive the Jacobian $J_Q$ for each frame k:

$$J_k = \begin{bmatrix} \frac{\partial(r_{K_L})}{\partial Q_x} & \frac{\partial(r_{K_1})}{\partial Q_y} & \frac{\partial(r_{K_1})}{\partial Q_z} \\ & \ddots & \\ & & \frac{\partial(r_{K_4})}{\partial Q_z} \end{bmatrix} \in R^{4 \times 3}. \quad (7)$$

Taking the first row as an example, where the other rows can be similarly analyzed:

Let $$r = \frac{r_1}{r_2} = \frac{xL}{\sqrt{d^2}} = \frac{x(RQ_rD + T_xRD)}{\sqrt{d^2}} = \frac{x(-RD_rQ + T_xRD)}{\sqrt{d^2}} \ldots \quad (8)$$

Let $A = -RD_x Q, B = T_x RD,$ (9)

Now, according to (8) and (9):

$$\sqrt{d^2} = \sqrt{L_1^T L_1 + L_2^T L_2} \quad (L_1 \text{ is the first row of } L). \quad (10)$$

$$= \sqrt{\frac{Q^T(A_1^T A_1)Q + 2B_1A_1Q + B_1^2 + Q^T(A_1^T A_2)Q +}{2B_2 A_2 Q + B_1^2}}$$

Let $M = A_1^T A_1 + A_2^T A_2$, $N = 2B_1 A_1 + 2B_2 A_2$, $P = B_1^2 + B_2^2$ $$\sqrt{d^2} = \sqrt{Q^T M Q + NQ + P} \quad (11)$$

Now, $$\rightarrow \frac{\partial r_1}{\partial Q} = xRD_x, \quad (12)$$

$$\frac{\partial r_2}{\partial Q} = \frac{Q^T M + \frac{1}{2}N}{r_2}$$

$$\text{Since } \frac{\partial r}{\partial Q} = \frac{\frac{\partial r_1}{\partial_6} r_2 - \frac{\partial r_2}{\partial_6} r_2}{r_2^2} \quad (13)$$

Thus, using these equations the line junction model may solve for the first row of Jacobian $J_k$ and similarly solve for the other rows.

6. Jacobian—3D Junction—Junction Directions $D_1$, $D_2$

The line junction model computes the Jacobians for $D_1$ and $D_2$. Using $D_1$ as an example, since the derivation of $D_2$ is substantively identical, the line junction model starts with the residual and Jacobian dimension, like described in section 5 above. The residual is identical to equation (6), while the Jacobian is:

$$J_k = \begin{bmatrix} \frac{\partial(r_{k_1})}{\partial \theta_1} & \frac{\partial(r_{k_1})}{\partial \alpha_1} \\ \frac{\partial(r_{k_2})}{\partial \theta_1} & \frac{\partial(r_{k_2})}{\partial \partial_1} \\ \vdots & \\ \frac{\partial(r_{k_4})}{\partial \theta_1} & \frac{\partial(r_{k_4})}{\partial \partial_1} \end{bmatrix} \in R^{4 \times 2}. \quad (14)$$

Differing from section 5, $$\frac{\partial(r_{k_3})}{\partial \theta_1}, \frac{\partial(r_{k_3})}{\partial \alpha_1}, \frac{\partial(r_{k_4})}{\partial \theta_1}, \frac{\partial(r_{k_4})}{\partial \alpha_1}$$

are all zero. Thus, the line junction model can reduce the size of $J_k$ to $R^{2 \times 2}$ and the size of residual, $r_k$, to $R^{2 \times 1}$.

Furthermore, the line junction model adds one more step in the chain of derivatives:
Let $$\frac{\partial r_{k_i}}{\partial \theta_1} = \frac{\partial r_{k_i}}{\partial D_1} \cdot \frac{\partial D_1}{\partial \theta_1} \quad (15)$$

Using a similar approach to that described previously gives the Jacobian for $(\theta_r, Q_2, \alpha_1, \partial_2)$ and combining them then gives up the full Jacobian for one frame, $J_k - R^{4 \times 7}$.

7. Jacobian—R,T

Deriving the Jacobian matrix R involves more work for the line junction model than deriving the Jacobian matrix for T The line junction model aims to determine the Jacobian with respect to $(\varphi,\theta,\emptyset)$, the three Euler angles.

Defining the conversion from Euler angles to a rotation matrix results in the following:

$$R = R_{z(\emptyset)} R_{y(\emptyset)} R_{x(\emptyset)}$$

where $$R_x = \begin{Bmatrix} 1 & 0 & 0 \\ 0 & \cos\varphi & -\sin\varphi \\ 0 & \sin\varphi & \cos\varphi \end{Bmatrix}, R_y = \begin{Bmatrix} -\cos\theta & 0 & \sin\theta \\ 0 & 1 & - \\ -\sin\varphi & 0 & \cos\theta \end{Bmatrix},$$

$$R_z = \begin{Bmatrix} \cos\emptyset & -\sin\emptyset & 0 \\ \sin\emptyset & \cos\emptyset & 0 \\ 0 & 0 & 1 \end{Bmatrix}$$

If R is expanded, where $$R = \begin{Bmatrix} a_{11} & a_{12} & a_{13} \\ a_{21} & a_{22} & a_{23} \\ a_{31} & a_{32} & a_{33} \end{Bmatrix},$$

the line junction model gets:

$a_{11} = \cos\theta \cos\phi$ $a_{12} = \sin\phi \sin\theta \cos\phi - \cos\phi \sin\phi$ $a_{13} = \cos\varphi \sin\theta \cos\phi + \sin\varphi \sin\phi$ $a_{21} = \cos\theta \sin\phi$ $a_{22} = \sin\varphi \sin\theta \sin\phi + \cos\varphi \cos\phi$ $a_{23} = \cos\varphi \sin\theta \sin\phi - \sin\varphi \cos\phi$ $a_{31} = -\sin\phi$ $a_{32} = \sin\varphi \cos\theta$ $a_{33} = \cos\phi \cos\theta$ \hfill (16)

The following steps are similar to sections 5 and 6, except that when computing the derivative with respect to a Euler angle, inside the chain rule, the line junction model inserts an extra step, which is $$\frac{\partial R}{\partial \alpha}.$$

After the calculation, $J_r \in R^{4\times 3}, J_T \in R^{4\times 3}, J_{RT} \in R^{4\times 6}$.

Junction Triangulation

Using the equations derived above, the line junction model can determine a pose (location and orientation) of a camera (e.g., client device 102) in an environment given one or more images. In one embodiment, the line junction model uses a 3D map to determine endpoints within the 3D map, which are used as vertices for 3D line junctions. The line junction model projects the endpoints from 3D to 2D using a predicted pose to determine if the endpoints are reflected in the one or more images. Since there is error in the projection, the line junction model computes the reprojection error and updates the predicted pose or poses of the camera for the one or more images to reduce the reprojection error. By varying the camera pose for multiple iterations, the line junction model may converge its estimation of the camera's pose until the calculated error is below a threshold. The line junction model uses this determined location as the location of the camera in the environment.

The line junction model determines the location of the camera in the environment using the equations above. In particular, given K frames and intrinsic and extrinsic parameters of the camera, represented as:

$$\begin{aligned} M_i \in R^{3\times 3} \\ P_i \in R^{4\times 4} \end{aligned} \cdot i = 1, \ldots, K.$$

where $M_i$ has the form $$M_i = \begin{pmatrix} fx & 0 & Cx \\ 0 & fy & Cy \\ 0 & 0 & 1 \end{pmatrix},$$

and $P_i$ has the form $$P_i = \begin{pmatrix} hi & ti \\ 0 & 1 \end{pmatrix},$$

and on each frame, there is a 2D line junction $J_i = (l_{i1}, l_{i2}, P_i)$ composed of two 2D line equations and one intersection point (akin to Q of FIG. 2A or P of FIG. 2B), where two lines meet.

Note that the equation of a 2D line is the 2D line's normal vector in 3D space, spanned by connecting the center of the camera and two endpoints of the line. By assuming all cameras come with calibration, the line junction model can work with camera coordinates. For example, $J_i = (l_{i1}, l_{i2}, P_i)$ are all in a camera coordinate system.

Given K correspondences of a line junction, the line junction model's goal is to triangulate the correspondences into 3D space to obtain a 3D line junction. The line junction model may use any appropriate 3D point triangulation method (e.g., using 2D and 3D junction points). On one embodiment, a 3D line junction can be defined as $J = (L_1, L_2, P)$, where $L_1$, $L_2$ are two unit-vectors indicating two directions, and P is the junction point where two 3D lines meet in 3D space.

Figure 2C:
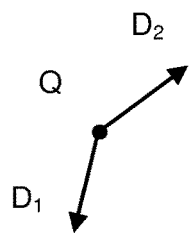
FIG. 2C depicts a representation of a line junction in 2D and 3D, according to one embodiment.
Figure 2C:
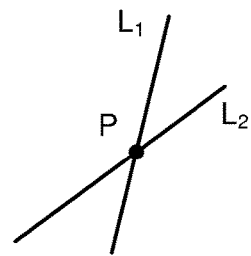
Figure 2C:
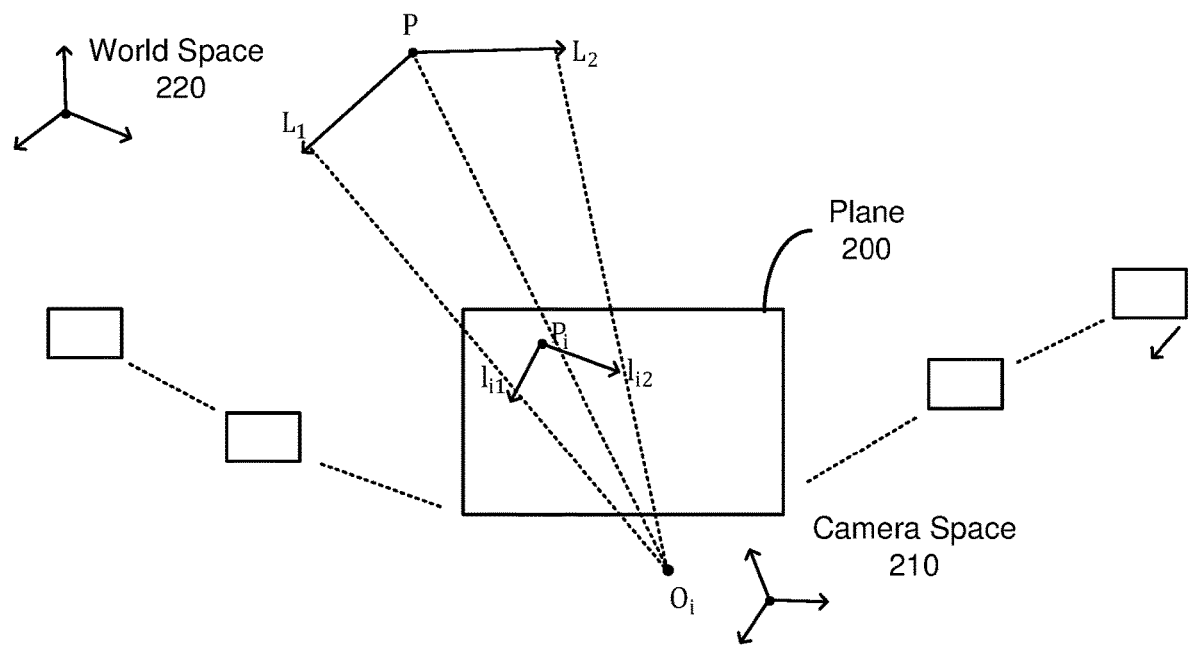

Unlike two 2D lines, two 3D lines might not intersect regardless of if they are not parallel. However, in one embodiment, the line junction model enforces constraints that those two 3D lines intersect, enabling the line junction model to use two direction vectors and one point to represent a 3D line junction. Since the two direction vectors are unit vectors as described previously, this representation has 7 degrees of freedom. This is represented by FIG. 2C, which depicts a 2D line junction with point $P_i$ and lines $l_{i1}$ and $l_{i2}$ in a camera space 210 in relation to a 3D line junction with point P and lines $L_1$ and $L_2$ in a world space 220. The line junction model or localization and mapping module 112 may create a representation of the environment akin to FIG. 2C by projecting the one or more images into a graph of vertices (points) and edges (lines) and use the representation to identify line junctions.

From 3D to 2D

FIG. 2C depicts how a 3D line junction relates to 2D line junction. A camera center $O_i$, a point of a 2D line junction on a frame of an image, $P_i$, and any point on line l. $l_{i1}$, gives a plane 200 in camera space 210 for the camera of the client device 102. The normal vector of the plane 200 is the equation for line 1, $l_{i1}$.

To find an arbitrary point $q_i$ on line 1 of a frame i and $s_i$ on line 2:

$$\begin{cases} l_{i1} = q_i \times P_i \\ l_{i2} = s_i \times P_i \end{cases} \quad (1)$$

Any point on the plane spanned by $\{O_i, P_i, q_i\}$, denoted as $x_i$, satisfies:

$$l_{i1}^T x_i = 0$$

Similarly, $$P_{i2}^T y_i = 0 \quad (2)$$

for any point $y_1$ on the plane spanned by $\{O_i, P_i, S_i\}$.

Note that the direction vector also represents a point on this plane, but it is in the world space 220, rather than the camera space 210. To bring $L_1$ to the camera 210 space on a frame i, the line junction model uses the following transformation.

$$q_1 = R_1 L_1 + t_1$$

However, since $L_1$ is a direction vector, translation can be ignored, which results in:

$$\begin{cases} q_i = R_i L_1 \\ s_i = R_i L_2 \end{cases} \quad (3)$$

Combining equations (2) and (3) results in a direct relation between 3D line junction direction vectors and 2D lines, as shown below:

$$\begin{cases} l_{i1}^T R_i L_1 = 0 \\ l_{i1}^T R_i L_2 = 0 \end{cases} \quad (4)$$

This holds for all frames i=1, . . . , K.

The point P can be transferred from the world 220 space to the camera space 210 using:

$$P_i = R_i P + t_i \quad (5)$$

Since its image on the frame should intersect simultaneously with both 2D lines, combining equations (2) and (5) gives:

$$\begin{cases} l_{i1}^T (R_i P + t_i) = 0 \\ l_{i2}^T (R_i P + t_i) = 0 \end{cases} \quad (6)$$

From 2D to 3D (4) and (6) give the equation to solve for a 3D junction from 2D junction correspondences.

Let $$N_1 = \begin{pmatrix} \cdots \\ l_{i1}^T R_i \\ \cdots \end{pmatrix}, N_2 = \begin{pmatrix} \cdots \\ l_{i2}^T R_i \\ \cdots \end{pmatrix};$$

two k×3 matrices.

According to equation (4), this is $$\begin{cases} N_i L_1 = 0 \\ N_i L_2 = 0 \end{cases} \quad (7)$$

Since $L_1$ and $L_2$ are both unit vectors, $\|L_1\|=\|L_2\|=1$, the line junction model can apply singular value decomposition (SVD) to $N_1$ and $N_2$:

$$N_1 = U_1 \Sigma_1 V_1^T, N_2 = U_2 \Sigma_2 V_2^T,$$

letting $L_1$ be a singular vector associated with the smallest singular value and doing the same for $L_2$.

According to equation (6), letting $$N = \begin{pmatrix} N_1 \\ N_2 \end{pmatrix}, \text{ and } b = \begin{pmatrix} \cdots \\ -P_{i1}^T t_i \\ \cdots \\ \cdots \\ -P_{i2}^T t_i \\ \cdots \end{pmatrix},$$

then the line junction model can solve for P by finding the least square solution of NP=b.

Therefore, $\hat{P} = (N^T N)^{-1} N^T b$ \quad (8)

The line junction model may use the process described above to calculate the location of the camera a multitude of times as the camera (e.g., client device 102) moves about the environment and captures more images.

Example Data Flow

Figure 3:
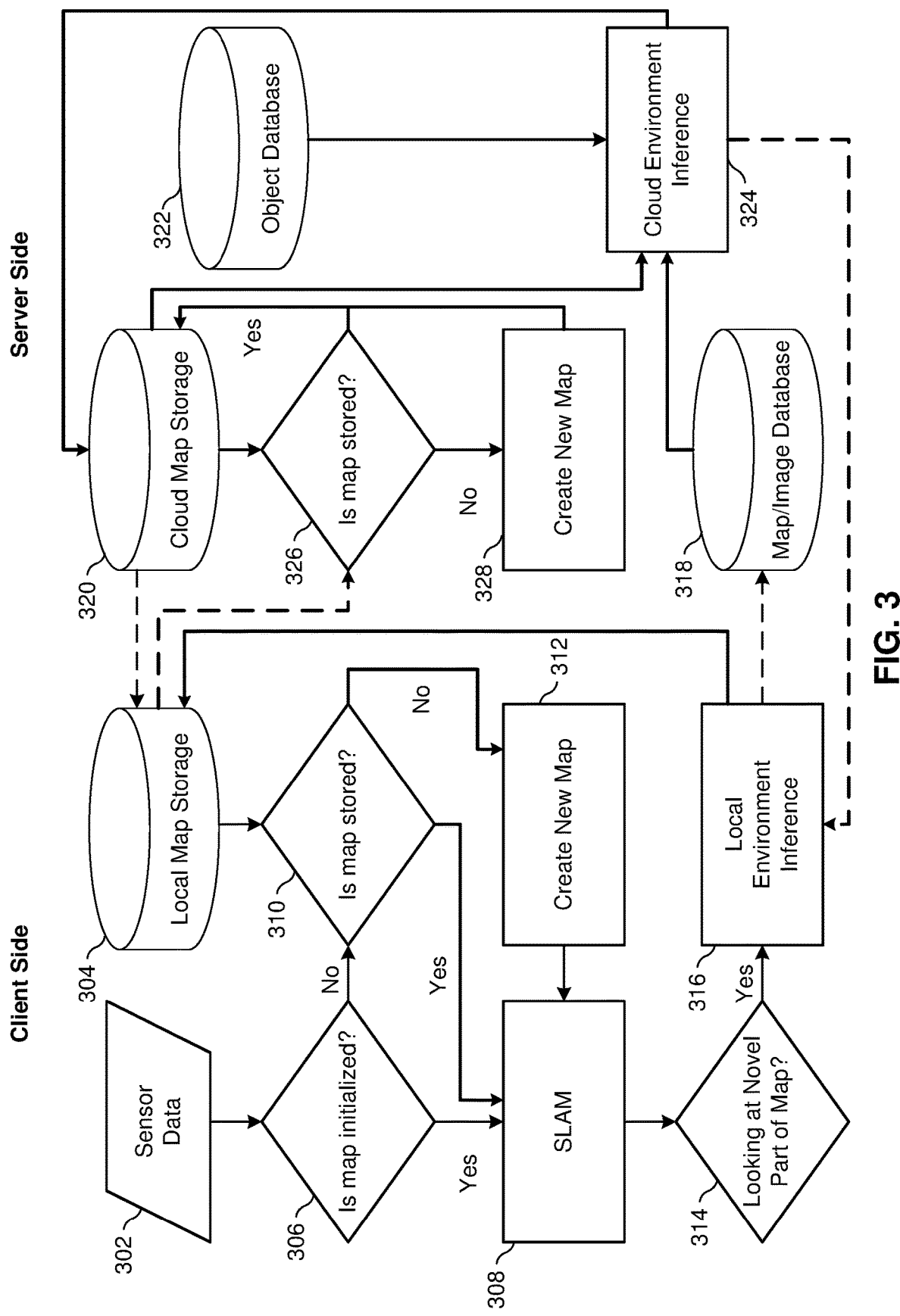
FIG. 3 is a flowchart that illustrates processes that are executable by the computing system of FIG. 1 for generating and displaying augmented reality data, according to one embodiment.

FIG. 3 is a flowchart showing processes executed by a client device 102 and a server device to generate and display AR data, according to one embodiment. The client device 102 and server device (collectively, "devices") may be similar to those shown in FIG. 1, where the server device is represented by the elements connected to the client device 102 by the network 104. Dashed lines represent the communication of data between the client device 102 and server device while solid lines indicate the communication of data within one of the devices. In other embodiments, the functionality may be distributed differently between the devices and/or different devices may be used.

At 302, sensor data is collected at the client device 102 by one or more sensors on the client device 102. In one embodiment, the sensor data includes images and inertial measurement information. The images are captured by one or more cameras. The inertial measurement information may be collected using a global positioning system (e.g., GPS) and gyroscope/accelerometer modules on the client device 102. Additional sensor data may be collected, such as pressure levels, illumination levels, sound levels, audio data, etc.

The client device 102 may maintain a local map storage at 304. The local map storage may be contained in the localization and mapping module 112 shown in FIG. 1 or in another location at the client device 102. The local map storage includes local point cloud data. The point cloud data comprises positions in space that form a mesh surface that can be built up into 3D maps of one or more environments, which may also be stored at the local map storage.

If a map is initialized at 306, then the client device 102 may initiate at 308 the SLAM functions at the localization and mapping module 112. The SLAM functions include a mapping system that builds up point clouds and uses tracking to find the location of the camera (e.g., on the client device 102) in space. The SLAM processes of the example further re-project animation or an augmented value back into the real word. If no map is located at 310, which may be stored in the local map storage at 304, then the client device 102 uses an initialization module to create map at 312.

Where a novel viewpoint in the environment is detected at 314 (e.g., if turning a corner into an area that has not been mapped/imaged or where there is an overlap and not all of the currently visible portion of the real world has been mapped/imaged), the client device 102 may record, at 316, data gathered by a local environment inference at the client device 102. For example, on determining that the client device 102 currently has a novel viewpoint, images captured by the camera with that viewpoint may be sent to the server device. The local environment inference may be used to determine when and how to transmit images with 3D data between the client device 102 and the server device. The local environment inference may include updated keyframes for the local mapping system (e.g., the localization and mapping module 112) and serialized image and/or map data.

On the server side, where actions are performed by the server device, novel viewpoint data (e.g., comprising point cloud information with mesh data on top) may be stored at 318 in cloud map storage 320. If a map is not stored 326 at the cloud map storage 320, the server device may create 328 a new map to store in the cloud map storage 320. The server device may add different parts of a real-world map from stored cloud map storage 320 and an object database 322. The cloud environment inference 324 (comprising added data captured by the client device 102 and processed by the server device) may be sent back to the client device 102. The added data may include points and meshes and object data having semantic labels (e.g., a wall or a bed) to be stored at the local map storage at 304.

Conceptual Diagram of Virtual World

Figure 4:
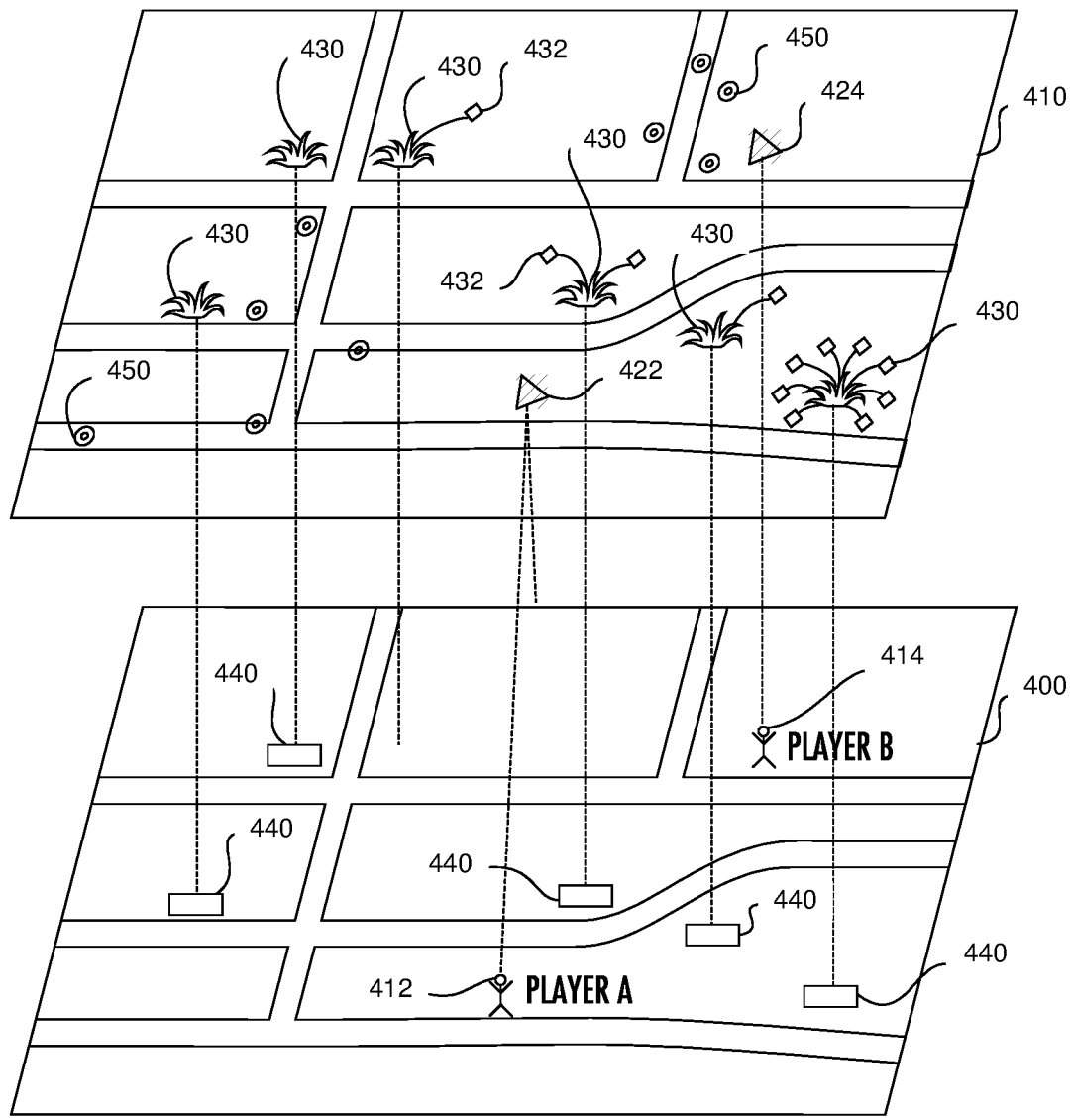
FIG. 4 depicts a conceptual diagram of a virtual world that parallels the real world that can act as the game board for players of a location-based parallel reality game, according to one embodiment.

FIG. 4 depicts a conceptual diagram of a virtual world 410 that parallels the real world 400 that can act as the game board for players of a location-based parallel reality game, according to one embodiment. The client device 102 of FIG. 1 may host a parallel reality game (or other location-based game) with a virtual world 410 that corresponds to the real world 400 as shown in FIG. 4.

As illustrated, the virtual world 410 can include a geography that parallels the geography of the real world 400. In particular, a range of coordinates defining a geographic area or space in the real world 400 is mapped to a corresponding range of coordinates defining a virtual space in the virtual world 410. The range of coordinates in the real world 400 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 410 corresponds to the player's position in the real world 400. For instance, the player A located at position 412 in the real world 400 has a corresponding position 422 in the virtual world 410. Similarly, the player B located at position 414 in the real world has a corresponding position 424 in the virtual world. As the players move about in a range of geographic coordinates in the real world 400, the players also move about in the range of coordinates defining the virtual space in the virtual world 410. In particular, a positioning system associated with the client device 102 carried by a player (e.g. a GPS system or other system used by the localization and mapping module 112) can be used to track the player's position as the player navigates the range of geographic coordinates in the real world. Data associated with the player's position in the real world 400 is used to update the player's position in the corresponding range of coordinates defining the virtual space in the virtual world 410. In this manner, players can navigate a continuous track in the range of coordinates defining the virtual space in the virtual world 410 by simply traveling among the corresponding range of geographic coordinates in the real world 400 without having to check in or periodically update location information at specific discrete locations in the real world 400.

The parallel reality game can include a plurality of game objectives requiring players to travel to and/or interact with various virtual elements and/or virtual objects scattered at various virtual locations in the virtual world 410. A player can travel to these virtual locations by traveling to the corresponding location of the virtual elements or objects in the real world 400. For instance, a positioning system of the client device 102 can continuously track the position of the player such that as the player continuously navigates the real world 400, the player also continuously navigates the parallel virtual world 410. The player can then interact with various virtual elements and/or objects at the specific location to achieve or perform one or more game objectives.

For example, referring to FIG. 4, a game objective can require players to capture or claim ownership of virtual elements 430 located at various virtual locations in the virtual world 410. These virtual elements 430 can be linked to landmarks, geographic locations, or objects 440 in the real world 400. The real-world landmarks or objects 440 can be works of art, monuments, buildings, businesses, libraries, museums, or other suitable real-world landmarks or objects. To capture these virtual elements 430, a player must travel to the landmark, geographic location, or object 440 linked to the virtual elements 430 in the real world and must perform any necessary interactions with the virtual elements 430 in the virtual world 410. For example, player A of FIG. 4 will have to travel to a landmark 440 in the real world 400 in order to interact with or capture, via the client device 102, a virtual element 430 linked with that particular landmark 440. The interaction with the virtual element 430 can require action in the real world 400, such as taking a photograph and/or verifying, obtaining, or capturing other information about the landmark or object 440 associated with the virtual element 430.

Game objectives can require that players use one or more virtual items that are collected by the players in the parallel reality game. For instance, the players may have to travel the virtual world 410 seeking virtual items (e.g. weapons or other items) that can be useful for completing game objectives. These virtual items can be found or collected by traveling to different locations in the real world 400 or by completing various actions in either the virtual world 410 or the real world 400. In the example shown in FIG. 4, a player uses virtual items 432 to capture one or more virtual elements 430. In particular, a player can deploy virtual items 432 at locations in the virtual world 410 proximate the virtual elements 430. Deploying one or more virtual items 432 proximate a virtual element 430 can result in the capture of the virtual element 430 for the particular player or for the team and/or faction of the particular player.

In one particular implementation, a player may have to gather virtual energy as part of the parallel reality game. As depicted in FIG. 4, virtual energy 450 can be scattered at different locations in the virtual world 410. A player can collect the virtual energy 450 by traveling to the corresponding location of the virtual energy 450 in the real world 400. The virtual energy 450 can be used to power virtual items and/or to perform various game objectives in the parallel reality game. A player that loses all virtual energy 450 can be disconnected from the parallel reality game.

According to aspects of the present disclosure, the parallel reality game can be a massive multi-player location-based game where every participant in the parallel reality game shares the same virtual world. The players can be divided into separate teams or factions and can work together to achieve one or more game objectives, such as to capture or claim ownership of a virtual element 430. In this manner, the parallel reality game can intrinsically be a social game that encourages cooperation among players within the parallel reality game. Players from opposing teams can work against each other during the parallel reality game. A player can use virtual items 432 to attack or impede progress of players on opposing teams.

The parallel reality game can have various features to enhance and encourage game play within the parallel reality game. For instance, players can accumulate a virtual currency or other virtual reward that can be used throughout the parallel reality game. Players can advance through various levels as the players complete one or more game objectives and gain experience within the parallel reality game. Players can communicate with one another through one or more communication interfaces provided in the parallel reality game. Players can also obtain enhanced "powers" or virtual items 432 that can be used to complete game objectives within the parallel reality game. Those of ordinary skill in the art, using the disclosures provided herein, should understand that various other game features can be included with the parallel reality game without deviating from the scope of the present disclosure.

Example Method

Figure 5:
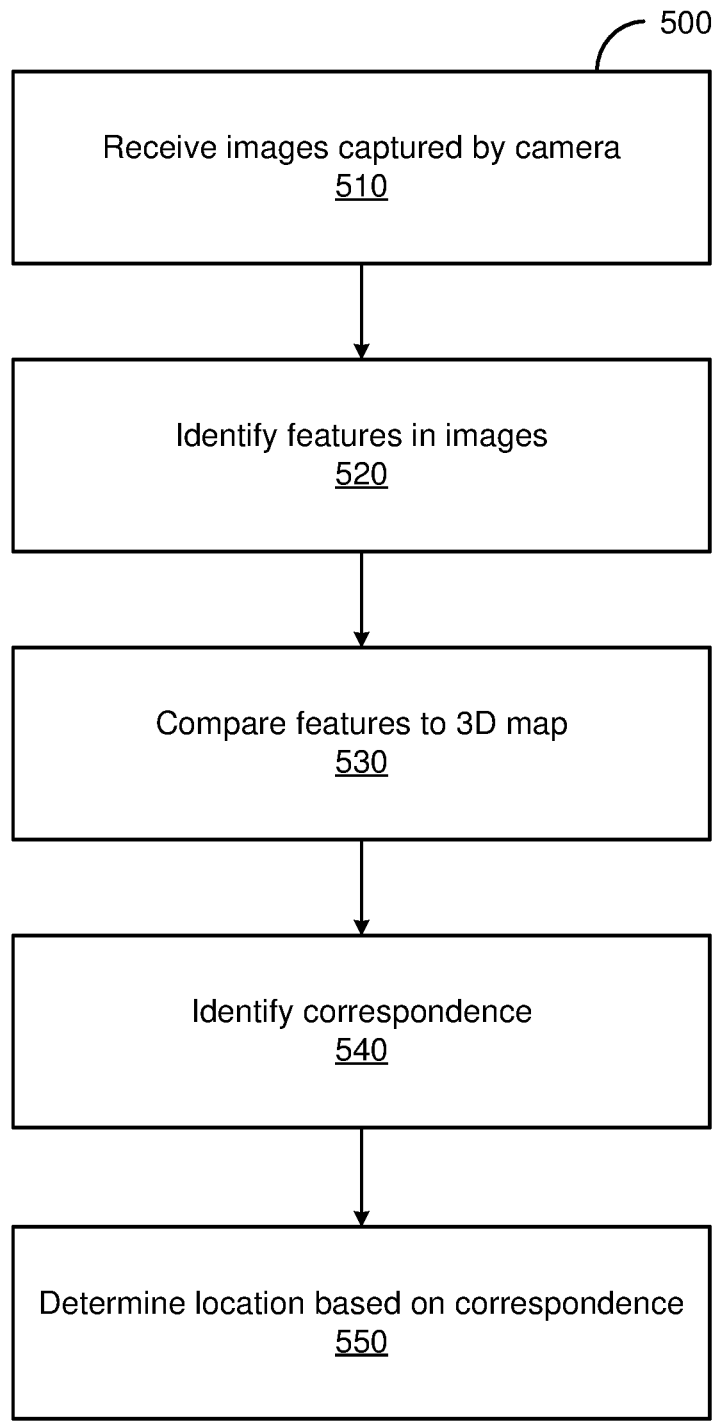
FIG. 5 is a flowchart illustrating a process for determining a location of a camera in an environment, according to one embodiment.

FIG. 5 is a flowchart illustrating a process (or "method") for determining a location of a camera in an environment, according to one embodiment. The steps of FIG. 5 are illustrated from the perspective of a client device 102 performing the process 500. However, some or all of the steps may be performed by other entities or components, such as by a server device. In addition, some embodiments may perform the steps in parallel, perform the steps in different orders, or perform different steps.

In the embodiment shown in FIG. 5, the process 500 begins with the client device 102 receiving 510 images captured by a camera of the client device 102. In some embodiments, the client device 102 may receive additional sensor data including video, audio, light levels, sound levels, inertial data, orientation, pressure, and/or any other available data from sensors. The client device 102 identifies 520 features in the images. The features may be line junctions, lines, curves, or any other features found in images.

The client device 102 retrieves a 3D map of the environment from the map database 124. The 3D map may have been created by a client device 102 or server device using image data of the environment captured by one or more cameras and the relative locations of the one or more cameras when the image data was captured. The client device 102 compares 530 the identified features to the 3D map of the environment, which includes map features such as map line junctions, map lines, map curves, and the like. The client device 102 identifies 540 a correspondence between the features identified 520 from the images and the map features. In some embodiments, the client device 102 may apply pattern matching to the identified 520 features and the 3D map to determine whether the identified 520 features and 3D map overlap or are adjacent (e.g., correspond). The client device 102 determines 550 a location of the client device 102 based on the correspondence(s). The location may be a real-world location that corresponds to a location in a virtual world for a parallel reality game. If the location was determined at a server device, the server device may send a view of the location in the virtual world to the client device 102 for a player to view via a display.

In some embodiments the client device 102 may select and apply other localization models to generate potential locations for the client device 102. For instance, each model may output a potential location. The potential locations may be defined based on a coordinate system within a local map (e.g., as selected based on the GPS coordinates of the client device 102). For example, GPS coordinates may indicate that the client device 102 is likely somewhere within a building, so a local map for that building is used. The client device 102 may compare the determined 550 location to the potential locations to determine a more accurate location of the client device 102 within a building (e.g., aiming for a precision of one centimeter). In some embodiments, the client device 102 may alter the determined 550 location based on the potential locations or may combine the determined 550 location with the potential location to generate a new location of the client device 102. Furthermore, an average, weighted combination, or other suitable technique may be used to generate a new location from the determined 550 location and the potential locations.

Furthermore, the client device 102 may check the determined 550 location for viability based on sensor data. For instance, the client device 102 may determine whether the determined 550 location is within a threshold distance of the location as indicated by GPS coordinates, that detected illumination levels in the images are consistent with expectations for the determined 550 location, that the images captured by the client device 102 are consistent with other images captured at similar locations, and the like.

In some embodiments, the client device 102 may receive one or more additional images from an additional client device connected to the client device 102 in a parallel reality game. The additional images may show the client device 102 in the environment, and the client device 102 may use these additional images to determine the location of the client device.

Computing Machine Architecture

Figure 6:
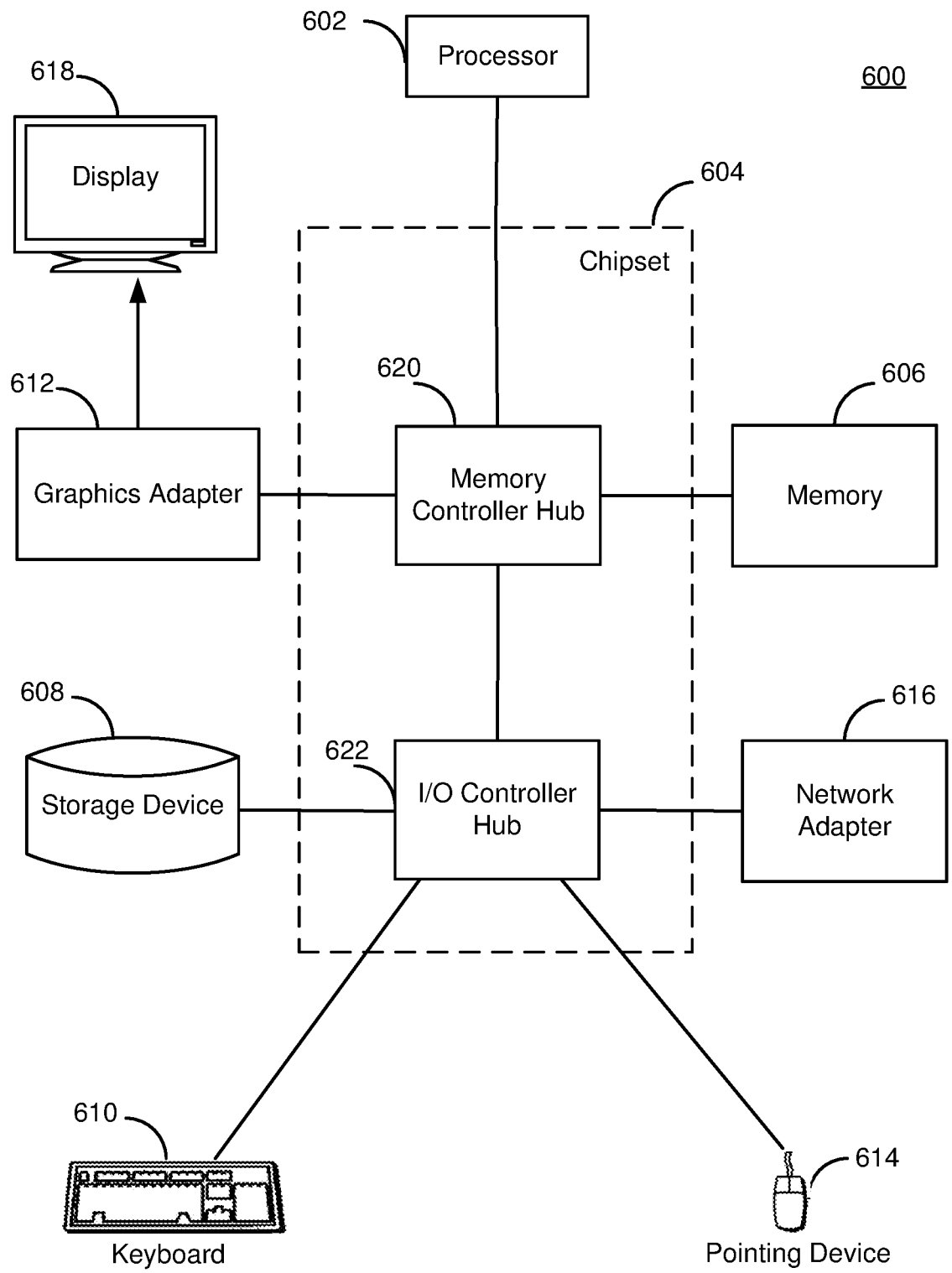
FIG. 6 is a block diagram illustrating an example computer system suitable for use in the networked computing environment of FIG. 1, according to one embodiment.

FIG. 6 is a high-level block diagram illustrating an example computer 600 suitable for use as a client device 102 or a server. The example computer 600 includes at least one processor 602 coupled to a chipset 604. The chipset 604 includes a memory controller hub 620 and an input/output (I/O) controller hub 622. A memory 606 and a graphics adapter 612 are coupled to the memory controller hub 620, and a display 618 is coupled to the graphics adapter 612. A storage device 608, keyboard 610, pointing device 614, and network adapter 616 are coupled to the I/O controller hub 622. Other embodiments of the computer 600 have different architectures.

In the embodiment shown in FIG. 6, the storage device 608 is a non-transitory computer-readable storage medium such as a hard drive, compact disk read-only memory (CD-ROM), DVD, or a solid-state memory device. The memory 606 holds instructions and data used by the processor 602. The pointing device 614 is a mouse, track ball, touch-screen, or other type of pointing device, and is used in combination with the keyboard 610 (which may be an on-screen keyboard) to input data into the computer system 600. The graphics adapter 612 displays images and other information on the display 618. The network adapter 616 couples the computer system 600 to one or more computer networks.

The types of computers used by the entities of FIG. 1 can vary depending upon the embodiment and the processing power required by the entity. For example, a server might include a distributed database system comprising multiple blade servers working together to provide the functionality described. Furthermore, the computers can lack some of the components described above, such as keyboards 610, graphics adapters 612, and displays 618.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with any claims that may issue, and equivalents thereof.

What is claimed is:

1. A method for locating a camera in an environment from one or more images captured by the camera, the method comprising:
   receiving one or more images captured by the camera of a client device;
   identifying line junctions in the one or more images;
   comparing the identified line junctions to a 3D map of the environment by determining endpoints within the 3D map and using the endpoints as vertices for 3D line junctions in the 3D map;
   identifying a correspondence between an identified line junction and a 3D line junction in the 3D map by iteratively projecting the determined endpoints from 3D to 2D using respective predicted poses to identify a predicted pose whose calculation error is below a threshold; and
   determining a pose of the camera within the environment using the correspondence.

2. The method of claim 1, further comprising:
   creating a representation of the environment around the camera by projecting the one or more images into a graph of vertices and edges;
   wherein the identified line junctions are identified from the representation, the identified line junctions comprising overlapping edges in the representation.

3. The method of claim 1, further comprising:
   receiving image data from an additional client device connected to the client device for a virtual game.

4. The method of claim 1, wherein comparing the identified line junctions to the 3D map of the environment comprises:
   applying pattern matching to the identified line junctions and the 3D map to determine whether the identified line junctions and the 3D map overlap or are adjacent.

5. The method of claim 1, wherein the 3D map was created using image data of the environment captured by one or more cameras and relative locations of the one or more cameras when the image data was captured.

6. The method of claim 1, wherein the determined pose corresponds to a location in a virtual world.

7. The method of claim 6, further comprising:
   sending, to the client device, a view of the location in the virtual world corresponding to the determined pose.

8. The method of claim 1, wherein each of the identified line junctions has seven degrees of freedom, wherein three degrees of freedom are for a junction point, two degrees of freedom are for each of two direction vectors.

9. The method of claim 1, wherein the one or more images are each optimized by frame by computing an update for a line junction with a Levenberg-Marquardt solver.

10. The method of claim 1, wherein identifying the line junctions in the one or more images comprises:
    determining 2D line equations of lines in the one or more images, wherein each 2D line equation describes a normal vector in 3D space;
    determining 2D line junctions in each of the one or more images, wherein each 2D line junction is comprised of two 2D line equations and an intersection point; and
    triangulating the 2D line junctions into 3D space to obtain 3D line junctions.

11. The method of claim 10, wherein triangulating the 2D line junctions comprises:
    converting coordinates of the 2D line junctions from each of the one or more images to one camera coordinate space; and
    transforming the converted 2D line junctions to 3D line junctions.

12. A non-transitory computer-readable storage medium comprising instructions for locating a camera in an environment from one or more images captured by the camera, the instructions comprising:
    instructions for receiving one or more images captured by the camera of a client device;
    instructions for identifying line junctions in the one or more images;
    instructions for comparing the identified line junctions to a 3D map of the environment by determining endpoints within the 3D map and using the endpoints as vertices for 3D line junctions in the 3D map;
    instructions for identifying a correspondence between an identified line junction and a 3D line junction in the 3D map by iteratively projecting the determined endpoints from 3D to 2D using respective predicted poses to identify a predicted pose whose calculation error is below a threshold; and
    instructions for determining a location of the camera within the environment using the correspondence.

13. The non-transitory computer-readable storage medium of claim 12, the instructions further comprising:
    instructions for creating a representation of the environment around the camera by projecting the one or more images into a graph of vertices and edges;
    wherein the identified line junctions are identified from the representation, the identified line junctions comprising overlapping edges in the representation.

14. The non-transitory computer-readable storage medium of claim 12, the instructions further comprising:
    instructions for receiving image data from an additional client device connected to the client device for a virtual game.

15. The non-transitory computer-readable storage medium of claim 12, wherein the instructions for comparing the identified line junctions to the 3D map of the environment further comprise:
    instructions for applying pattern matching to the identified line junctions and the 3D map to determine whether the identified line junctions and the 3D map overlap or are adjacent.

16. The non-transitory computer-readable storage medium of claim 12, wherein the 3D map was created using image data of the environment captured by one or more cameras and relative locations of the one or more cameras when the image data was captured.

17. The non-transitory computer-readable storage medium of claim 12, wherein the determined location corresponds to a location in a virtual world.

18. The non-transitory computer-readable storage medium of claim 17, the instructions further comprising:
   instructions for sending, to the client device, a view of the location in the virtual world corresponding to the determined location.

19. The non-transitory computer-readable storage medium of claim 12, wherein each of the identified line junctions has seven degrees of freedom, wherein three degrees of freedom are for a junction point, two degrees of freedom are for each of two direction vectors.

20. A computer system comprising:
   a computer processor; and
   a non-transitory computer-readable storage medium storing instructions for locating a camera in an environment from one or more images captured by the camera, the instructions when executed by the computer processor performing actions comprising:
   receiving the one or more images captured by the camera of a client device;
   identifying line junctions in the one or more images;
   comparing the identified line junctions to a 3D map of the environment by determining endpoints within the 3D map and using the endpoints as vertices for 3D line junctions in the 3D map;
   identifying a correspondence between an identified line junction and a 3D line junction in the 3D map by iteratively projecting the determined endpoints from 3D to 2D using respective predicted poses to identify a predicted pose whose calculation error is below a threshold; and
   determining a location of the camera within the environment using the correspondence.

* * * * *